*US006827280B2*

(12) United States Patent
Reis

(10) Patent No.: US 6,827,280 B2
(45) Date of Patent: Dec. 7, 2004

(54) TRANSPONDER IN POWER DOWN MODE DURING LOAD MODULATION

(75) Inventor: Kuno Reis, Frohnleiten (AT)

(73) Assignee: Koninklijke Philips Electronics N.V., Eindhoven (NL)

(*) Notice: Subject to any disclaimer, the term of this patent is extended or adjusted under 35 U.S.C. 154(b) by 35 days.

(21) Appl. No.: 10/206,027

(22) Filed: Jul. 26, 2002

(65) Prior Publication Data

US 2003/0024985 A1 Feb. 6, 2003

(30) Foreign Application Priority Data

Aug. 3, 2001 (EP) ............................................. 01890225

(51) Int. Cl.⁷ ............................................. G06K 19/06
(52) U.S. Cl. ..................................................... 235/492
(58) Field of Search ................................. 235/492–493, 235/487, 476, 375, 380, 441, 449, 450–451; 101/26

(56) References Cited

U.S. PATENT DOCUMENTS 5,286,955 A    2/1994  Klosa ........................... 235/380
5,640,003 A *  6/1997  Makino ......................... 235/491
5,664,157 A *  9/1997  Takahira et al. ............... 703/23
5,698,837 A * 12/1997  Furuta .......................... 235/492
5,745,049 A *  4/1998  Akiyama et al. ......... 340/870.17
6,164,532 A * 12/2000  Suga et al. ................... 235/380
6,202,927 B1 *  3/2001  Bashan et al. ................ 235/451
6,340,116 B1 *  1/2002  Cecil et al. ................... 235/492
6,533,178 B1 *  3/2003  Gaul et al. .................... 235/492
6,631,479 B1 * 10/2003  Nishimura ...................... 714/18

* cited by examiner

Primary Examiner—Thien M. Le
Assistant Examiner—Edwyn Labaze
(74) Attorney, Agent, or Firm—Kevin Simons

(57) ABSTRACT

A data carrier (1) for the transmission of transmission data (UD) to a base station over a transmission time range (TT) containing load time ranges (TA) and load relief time ranges (TB0, TB1) comprises cut-off means (13) which, once activated, set principal power consumers (10, 12) of the data carrier (1) into an energy-saving operating condition for a cut-off time range containing the load time range (TA), so that the storage capacitor (9) for operation of the passive data carrier (1) over the load time ranges (TA) may advantageously have only a relatively low capacitance.

11 Claims, 2 Drawing Sheets

TRANSPONDER IN POWER DOWN MODE DURING LOAD MODULATION

BACKGROUND OF INVENTION

1. Field of the Invention

The invention relates to a data carrier which is designed for the communication of transmission data with a base station in which power consumers of the data carrier can be deactivated over certain time ranges.

The invention further relates to a circuit of a data carrier as defined in the first paragraph.

The invention further relates to a method of temporarily deactivating power consumers of a data carrier as described in the first paragraph.

2. Description of Related Art

The document U.S. Pat. No. 5,286,955 discloses a base station which is designed for the transmission of transmission data to a data carrier over a transmission time range. For this purpose the base station emits an electromagnetic carrier field which is received in the data carrier and from which the data carrier generates a carrier signal.

The base station, however, transmits the electromagnetic carrier field only over on-periods contained in the transmission time range and not over off-periods contained in the transmission time range. If the data carrier detects 16–23 cycles of the carrier signal in an on-time range contained between off-periods, the data carrier decodes a bit "1" of the transmission data, and if the data carrier detects 8–15 cycles in an on-period contained between off-time ranges, the data carrier a decodes a bit "0" of the transmission data transmitted from the base station to the data carrier.

The data carrier has power generating means for the generation and storage of a DC power from the carrier signal received, the DC power being used for operation of the passive data carrier. Since the power generating means of the known data carrier cannot generate a DC power over the off-time ranges, the data carrier has a voltage detector which detects the fall in the amplitude of the carrier signal. When the amplitude of the carrier signal has fallen below a cut-off threshold, the voltage detector deactivates clock signal generating means of the known data carrier, so that the power consumption of the data carrier is substantially reduced in a reception mode of the data carrier.

Whilst the clock signal generating means of the data carrier are deactivated, the data carrier is supplied from a storage capacitor charged during the on-time ranges. When the amplitude of the carrier signal at the start of the on-period is once more greater than the cut-off threshold, the voltage detector again activates the clock signal generating means, so that the known data carrier continues the decoding of the transmission data to be received.

Were the known data carrier to be similarly operated in a transmission mode for the transmission of transmission data to the base station, the same disadvantage would occur in the transmission mode as in the reception mode, namely that the power consumption of the data carrier would not be reduced immediately at the start of each off-period but only with a time delay once the carrier signal had already fallen below the cut-off threshold. As a result, some of the DC power stored in the storage capacitor would already be consumed before deactivation of the principal power consumers of the data carrier, so that the storage capacitor would have to be designed with a relatively large capacitance, which is very disadvantageous especially in the case of an integrated circuit.

BRIEF SUMMARY OF THE INVENTION

It is an object of the invention is create a data carrier of the generic type specified in the first paragraph, a circuit of the generic type specified in the second paragraph and a method of the generic type specified in the third paragraph in which the aforementioned disadvantages in the transmission mode of the data carrier are avoided.

To achieve the aforementioned object, features according to the invention are provided in such a data carrier, so that the data carrier can be characterized as specified below.

A data carrier for the transmission of transmission data to a base station over a transmission time range containing load time ranges and load relief time ranges, having receiving means for the reception of a carrier signal from an electromagnetic carrier field and having power generating means for the generation and storage of a DC power from the carrier signal received, the DC power being used for operation of the passive data carrier, and having data processing means for the processing and output of the transmission data to be transmitted and having transmission means for transmission of the transmission data to the base station over the transmission time range, the electromagnetic carrier field being subjected to a load by the transmission means over the load time ranges, so that over the load time ranges the amplitude of the carrier signal received is essentially less than over the load relief time ranges and the data carrier is operated over the load time ranges essentially with the stored DC power, cut-off means being provided which are designed to deactivate at least one power consumer of the data carrier at a cut-off time defined by the data processing means or by the transmission means immediately prior to or at the start of each load time range and which are designed to reactivate the deactivated power consumers once a cut-off time range following the cut-off time has elapsed.

To achieve the aforementioned object, features according to the invention are provided in such a circuit, so that the circuit can be characterized as specified below.

A circuit for a data carrier for the transmission of transmission data to a base station, the circuit being of integrated design and the circuit with antenna means connected forming the data carrier according to the paragraph above.

To achieve the aforementioned object, features according to the invention are provided in such a method, so that the method can be characterized as specified below.

A method of transmitting transmission data from a data carrier to a base station over a transmission time range containing load time ranges and load relief time ranges, comprising the following stages: reception of a carrier signal from an electromagnetic carrier field; generation and storage of a DC power from the carrier signal received, said DC power being used for operation of the passive data carrier; processing and output of the transmission data to be transmitted; transmission of the transmission data to the base station over the transmission time range, the electromagnetic carrier field being subjected to a load by the transmission means over the load time ranges, so that over the load time ranges the amplitude of the carrier signal received is essentially less than over the load relief time ranges and the data carrier is essentially operated by means of the stored DC power over the load time ranges, at least one power consumer of the data carrier being deactivated at a fixed cut-off time immediately prior to or at the start of each load time range, and the deactivated power consumer being reactivated once a cut-off time range following the cut-off time has elapsed.

As a result, the cut-off means have already substantially reduced the power consumption of the passive data carrier immediately prior to the actual fall in the carrier signal over the load time range. This affords the advantage that a DC power storage device (storage capacitor) provided for operation of the data carrier in the transmission mode over the load time ranges can have a relatively low capacitance, since whilst the amplitude of the carrier signal is falling at the start of the load time range, principal power consumers of the data carrier are already deactivated and consume virtually no DC power.

The measures as claimed in claims 2, 3 and 8 afford the advantage that the largest power consumers of the data carrier consume no DC power over the load time ranges of the transmission mode owing to the deactivation of the clock signal generating means and/or the data processing means by the cut-off means.

The provision of the timer element in the cut-off means for determining the duration of the cut-off time range affords the advantage that the clock signal generating means of the data carrier, which according to the state of the art are necessary for determining time ranges, can be deactivated over the load time ranges, so that a principal power consumer consumes no power over the load time ranges. In addition, the measures as claimed in claim 4 afford the advantage that the cut-off means can be provided in a particularly simple and inexpensive way, making it possible to incorporate the cut-off means in an integrated circuit.

The measures as claimed in claim 5 afford the advantage that the electromagnetic carrier field is subjected to particularly heavy loading by the data carrier, thereby permitting a reliable decoding of the transmission data in the base station.

The measures as claimed in claims 6, 9 and 11 afford the advantage that the cut-off time range, possibly modified owing to component tolerances, can be periodically calibrated. Components with larger tolerance ranges can thus be used for the timer element, making the data carrier inexpensive to produce.

BRIEF DESCRIPTION OF THE DRAWINGS

The invention will be described in more detail below with reference to examples of embodiments shown in the drawings, to which, however, the invention is not limited.

DETAILED DESCRIPTION

Figure 1:
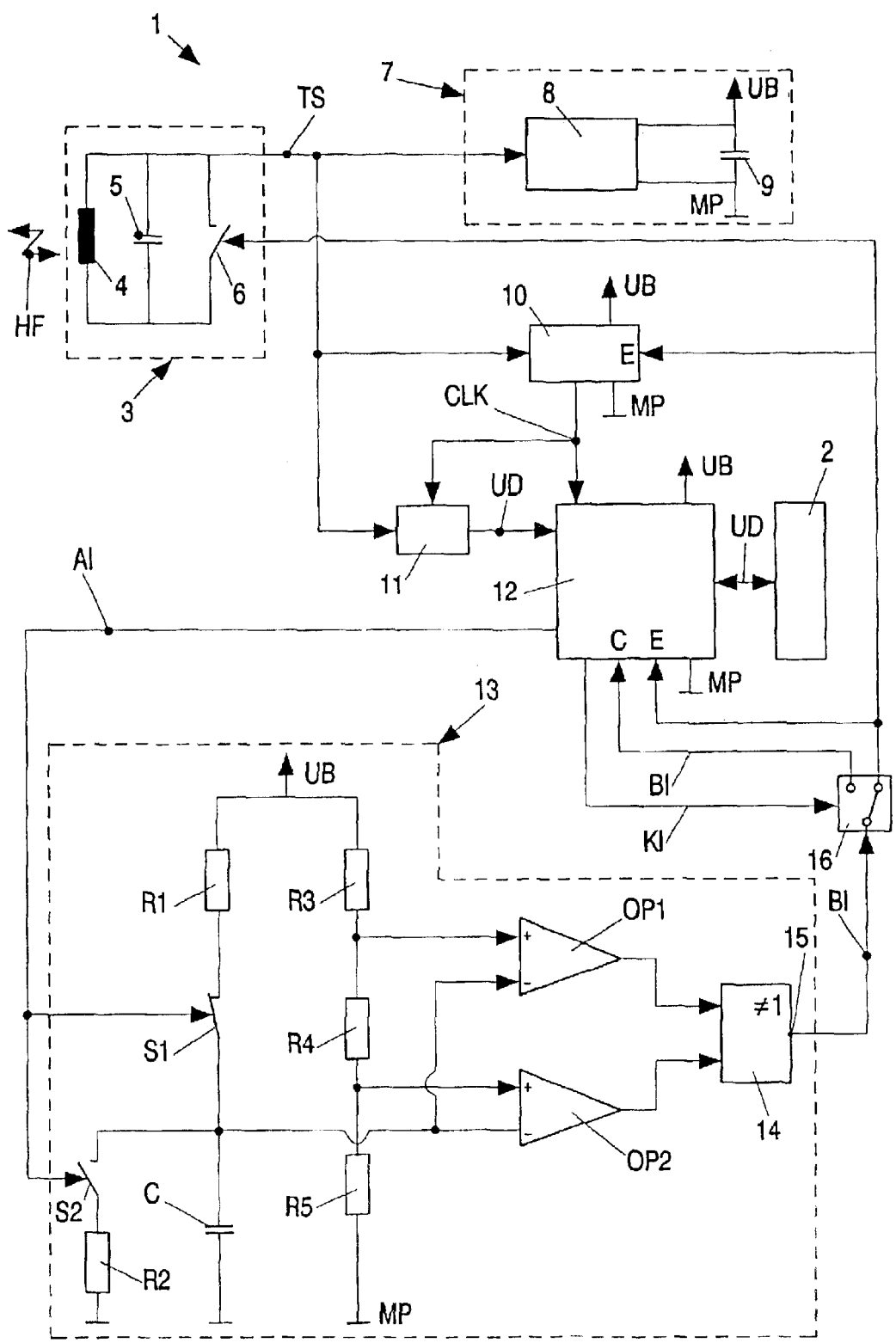
FIG. 1 shows a data carrier which has cut-off means for the deactivation of data processing means and clock generating means of the data carrier over load time ranges.

FIG. 1 shows a data carrier 1 for the transmission of transmission data UD to a base station not represented in FIG. 1 and for the reception of transmission data UD from said base station. Such a base station may be provided, for example, in a door frame of a bus and may communicate transmission data UD with the data carrier 1 via an electromagnetic carrier field HF emitted by the base station at a carrier frequency $f_T$ of 13.56 MHz, for example. Each passenger on the bus carries with them a data carrier in the form of a smart card corresponding to the data carrier 1, on which card the fare is debited from a credit stored in storage means 2 of the data carrier 1 when the passenger boards the bus. The amount of the fare to be paid is here communicated to the data carrier 1 in the transmission data UD. Numerous other fields of application of such data carriers 1 will be known to those skilled in the art.

The data carrier 1 has transmission and receiving means 3, which form antenna means and which are designed for the reception of a carrier signal TS from the electromagnetic carrier field HF. Here the carrier signal TS corresponds to the envelope of the received electromagnetic carrier field HF and may contain transmission data UD modulated in a reception mode of the data carrier 1. In a transmission mode of the data carrier 1, the transmission and receiving means 3 are designed to subject the electromagnetic carrier field HF to a load, in order to communicate pulse-duration coded transmission data UD, duly load-modulated, to the base station.

For this purpose, the transmission and receiving means 3 have a coil 4 and a capacitor 5, which form an oscillating circuit resonance-tuned to the carrier frequency $f_T$. A switch 6, by means of which the oscillating circuit can be short-circuited in the closed switch position, is provided as a load for loading the electromagnetic carrier field HF in the transmission mode of the data carrier 1. With the transmission mode activated in the data carrier 1 over a transmission time range TT, the switch 6 is closed over load time ranges TA and is opened over load relief time ranges TB0 and TB1, as can be seen from the time sequence of the carrier signal TS shown in FIG. 2. According to the pulse-duration coding, the load time ranges TA always have the same duration, whereas the duration of the load relief time range TB0 is identified by a bit "0" and the duration of the load relief time range TB1 by a bit "1" of the transmission data UD communicated to the base station by the data carrier 1.

The data carrier 1 has power generating means 7 for the generation and storage of a DC power or an operating voltage UB of 5 V DC from the received carrier signal TS, the operating voltage UB being used for operation of the passive data carrier 1. For this purpose the power generating means 7 contain a rectifier stage 8 for rectification of the carrier signal TS and a storage capacitor 9 for storage of the DC power and for delivering the operating voltage UB to further means of the data carrier 1.

Figure 2:
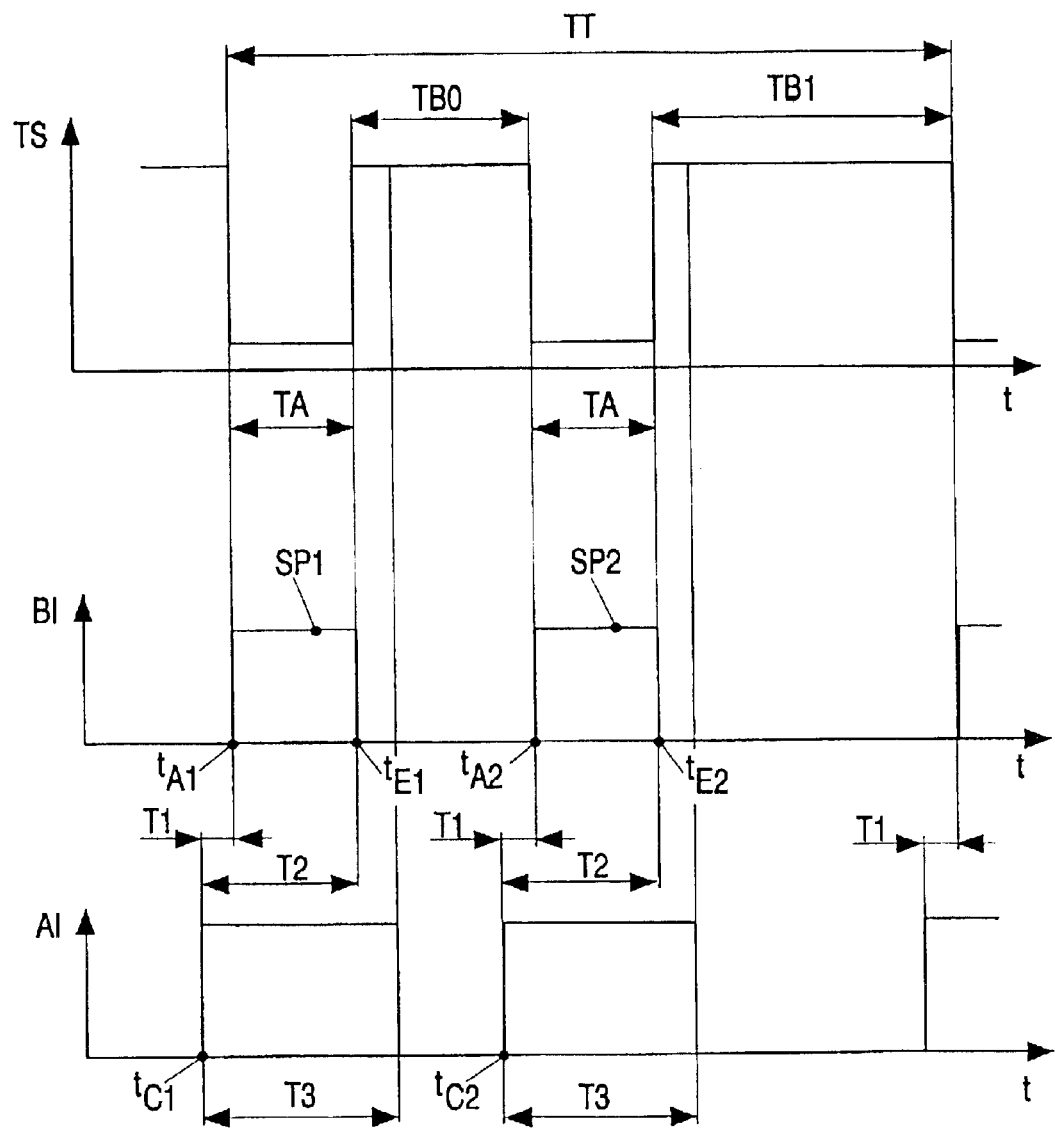
FIG. 2 shows time sequences of signals in the data carrier according to FIG. 1.

As is shown in FIG. 2, the carrier signal TS has only a very low amplitude over the load time ranges TA, which is due to the loading of the electromagnetic carrier field HF by the data carrier 1. As a result, the power generating means 7 are unable to generate the DC power needed for normal operation of the data carrier 1 from the carrier signal TS over the load time ranges TA, for which reason the data carrier 1, is operated from the DC power stored in the back-up capacitor 9 over the load time ranges TA.

The data carrier 1 furthermore has clock generating means 10 for the generation of a clock signal CLK for the data carrier 1 from the received carrier signal TS. In these, a counter stage of the clock generating means 10 counts each clock cycle of the carrier signal TS and after a number of M counted clock cycles of the carrier signal TS emits a clock cycle of the clock signal CLK. The carrier signal TS therefore has M times the frequency of the clock signal CLK.

The power consumption of the clock generating means 10 is relatively high because the counter stage counts clock cycles of the high-frequency carrier signal TS, for which reason internal capacitors have to be recharged at the carrier frequency $f_T$. In order to substantially reduce the power consumption of the clock generating means 10 over specific time ranges, the clock generating means 10 have an inverting enable input E, by means of which the clock generating means 10 can be switched from a normal operating condition to an energy-saving operating condition. When the ground potential MP is present at this enable input E, the clock generating means 10 are switched to their normal, that is to say active operating condition and generate the clock signal CLK, and when the operating voltage UB is present at this enable input E, the clock generating means 10 are switched to their energy-saving operating condition and therefore deactivated, so that no clock signal CLK is generated and virtually no DC power is consumed.

In addition, the data carrier 1 has a demodulator 11, to which the carrier signal TS and the clock signal CLK can be fed. The demodulator 11 is designed for demodulation of the transmission data UD modulated by the base station, the data carrier 1 being able to receive said data in the carrier signal TS when the data carrier 1 is in the reception mode.

The data carrier 1 furthermore has data processing means 12, which are designed for the processing of transmission data UD emitted by the demodulator 11 and received in the reception mode. The data processing means 12 are here designed for reading out data stored in the storage means 2 and for the storage of processed transmission data UD in the storage means 2.

The data processing means 12 are furthermore designed for the pulse duration coding of transmission data UD to be transmitted to the base station in the transmission mode of the data carrier 1. This defines the sequence of the "0" and "1" bits to be transmitted and hence the sequence for the durations of the load relief time ranges TB0 and TB1 between the load time ranges TA. The data processing means 12 likewise have an inverting enable input E, by means of which the data processing means 12 can be switched from their normal operating condition to an energy-saving operating condition, in which the power consumption of the data processing means 12 can be substantially reduced. Whilst in the energy-saving operating condition, the processing of transmission data UD is interrupted, and it is resumed as soon as the data processing means 12 are switched back to their normal operating condition.

The data carrier 1 also has cut-off means 13, which are designed to deactivate at least one power consumer of the data carrier 1 at a cut-off time $t_{A1}$ fixed by the data processing means 12, and which are designed to reactivate the deactivated power consumers once a cut-off time range following the cut-off time $t_{A1}$ has elapsed. In the data carrier 1 of FIG. 1, the duration of the cut-off time range is made equal to the duration of the load time ranges TA, which, however, need not be the case.

The provision of the cut-off means 13 ensures that the power consumption of the passive data carrier 1 is already substantially reduced immediately prior to the fall in the amplitude of the carrier signal TS at the start of the load time range TA. This affords the advantage, that the storage capacitor 9 intended for operation of the data carrier 1 in the transmission mode over the load time ranges TA can have a relatively low capacitance, because principal power consumers of the data carrier are already deactivated and consume virtually no more DC power while the amplitude of the carrier signal TS is falling at the start of the load time ranges TA.

The cut-off means 13 form a timer element, which contains resistors R1, R2, R3, R4 and R5, switches S1 and S2, a capacitor C, two operational amplifiers OP1 and OP2, and an anti-coincidence stage 14. If activation information AI delivered to the cut-off means 13 by the data processing means 12 and represented in FIG. 2 has a low voltage value, the cut-off means 13 are set to their idle state, and if the activation information AI has a high voltage value, the cut-off means 13 are set to their active state.

In FIG. 1, the cut-off means 13 are shown in their idle state, the switch S1 being closed and the switch S2 being opened. The capacitor C is charged to the operating voltage UB via the resistor R1 in the idle state. In this idle state, the negative inputs of the operational amplifiers OP1 and OP2 connected to the capacitor C have a more positive potential than the positive inputs of the operational amplifiers OP1 and OP2, so that the ground potential MP is delivered to the outputs of both operational amplifiers OP1 and OP2.

The ground potential MP delivered to the inputs of the anti-coincidence stage 14 from the outputs of the operational amplifier OP1 and OP2 means that the anti-coincidence stage 14 likewise emits the ground potential MP at its output stage 15. The anti-coincidence stage 14 only emits the operating voltage UB at its output 15 if different potentials are present at its inputs, as is usual in the case of anti-coincidence logic.

If the data processing means 12 deliver the activation information AI to the cut-off means 13 at an activation time $t_{C1}$, the cut-off means 13 are set to their active condition, whereupon the switch S1 is opened and the switch S2 closed. In the active condition, the capacitor C is discharged via the resistor R2 from the operating voltage to the ground potential MP. Once a first period of time T1 has elapsed since the activation time $t_{C1}$, the negative input of the operational amplifier OP1 now has a more negative potential than the positive input of this operational amplifier OP1, following which the operational amplifier OP1 and finally the anti-coincidence stage 14 emits the operating voltage UB at its output 15 when the first period of time T1 has elapsed since the activation time $t_{C1}$.

After a second period of time T2 has elapsed since the activation time $t_{C1}$, the negative input of the operational amplifier OP2 has a more negative potential than the positive input of this operational amplifier OP2, following which the operational amplifier OP2 likewise emits the operating voltage UB at its output when the second period of time T2 has elapsed since the activation time $t_{C1}$. Since as a result both inputs of the anti-coincidence stage 14 again have the same potential, the anti-coincidence stage 14 again emits the ground potential MP at its output 15 when the second period of time T2 has elapsed since the activation time $t_{C1}$.

As a result, the cut-off means 13 deliver blocking information BI at the output 15 of the anti-coincidence stage 14, the blocking information having a voltage pulse SP with a duration T2−T1 predetermined by the resistances of the resistors R2, R3, R4 and R5 and by the capacitance of the capacitor C after each activation by the activation information AI. This period of time T2−T1 determined by the cut-off means 13 is utilized by the data carrier 1 as duration for the load time range TA, the clock generating means 10 advantageously being deactivated for the determination thereof.

This affords the advantage that by applying the blocking information BI to the enable inputs E of the clock generating means 10 and the data processing means 12, the principal power consumers of the data carrier 1 are deactivated for the duration of the load time range TA, and the data carrier 1 therefore consumes virtually no DC power over this load time range TA. As a result, a capacitor with a relatively low capacitance can advantageously be chosen as the storage capacitor 9, which can be easily integrated. Constructing the timer element of the cut-off means 13 with the capacitor C, which is charged and then discharged in order to determine the load time range TA, provides a particularly simple and cost-effective timer element.

In addition, the blocking information BI is also used for closing the switch 6 at the start of the load time range TA and for reopening the switch 6 after the load time range TA, so that even with the clock generating means 10 deactivated a loading of the electromagnetic carrier field HF is advantageously guaranteed for the constant load time range TA.

In order to ensure that the transmission data UP to be transmitted to the base station can be readily demodulated, it is particularly advantageous if, over the load time ranges TA, the electromagnetic carrier field HF is loaded as heavily as possible, by a short-circuit, as in the case of the data carrier 1. Since as a result the amplitude of the carrier signal TS is very small over load time ranges TA, it would not be possible for the clock generating means 10 to generate the clock signal CLK over the load time ranges TA.

In a data carrier which has no cut-off means 13 according to the invention and which determines the duration of the load time range TA by means of the clocking stage and the timer stage of the data processing means, the electromagnetic carrier field HF might well be loaded to a lesser extent only in order to ensure the functioning of the clock signal generating means. This data carrier would then have the disadvantage that the transmission data UD load-modulated thereby cannot be as readily demodulated by the base station and are hence more susceptible to error. It is therefore of particular advantage in the case of the data carrier 1, with regard to a ready demodulation of the load-modulated transmission data UD, that the duration of the load time range TA be determined by the cut-off means 13 and not with the aid of the clock generating means 10.

The operating principle and other advantages of the data carrier 1 of FIG. 1 and a method of transmitting transmission data will now be explained in more detail with reference to an embodiment of the data carrier 1 in the transmission mode. It is assumed in this example that the data carrier 1 sends the bit sequence "01" as pulse duration coded transmission data UD to the base station over the transmission time range TT.

For this purpose, the data processing means 12 deliver the activation information AI to the cut-off stage 13 at the activation time $t_{C1}$, whereupon once the first period of time T1 has elapsed the positive flank of the voltage pulse SP1 of the blocking information BI switches the clock generating means 10 and the data processing means 12 to their energy-saving operating condition and closes the switch 6. As a result, the data carrier 1 consumes virtually no more DC power from the cut-off time $t_{A1}$ and imposes a load on the electromagnetic carrier field HF.

Over the load time range TA, the very low DC power needed to maintain the interim results of the interrupted processing of the clock generating means 10 and the data processing means 12 is drawn from the storage capacitor 9. Once the load time range TA determined by the cut-off means 13 has elapsed, both the clock generating means 10 and the data processing means 12 are set to their normal operating condition by the falling flank of the first voltage pulse SP1 of the blocking information BI at an on-time $t_{E1}$, and the switch 6 is opened. The processing by the data processing means 12 is resumed thereby, and the load on the electromagnetic carrier field HF is ended.

Once a third period of time T3 has elapsed since the activation time $t_{C1}$, by which time the data processing means 12 have already been switched back from the energy-saving operating condition to the normal operating condition, the data processing means 12 terminate the output of activation information AI, whereupon the cut-off means 13 are returned to their idle condition. It is possible by means of a switch 16 to prevent a transient voltage pulse of the blocking information B1, caused by charging of the capacitor C up to the operating voltage UB, from reaching the enable input E and the switch 6.

By counting clock cycles of the clock signal CLK, a timer stage of the data processing means 12 determines the period of time that has elapsed since the on-time $t_{E1}$ and once a period of time TB0–TB1 has elapsed since the on-time $t_{E1}$ the data processing means 12 will again deliver the activation information AI to the cut-off means 13 at an activation time $t_{C2}$. The result of this is that the electromagnetic carrier field HF is again subject to loading after the load relief time range TB0 characterizing the bit "0".

Similarly, a second voltage pulse SP2 of the blocking information BI generated by the cut-off means 13 again predetermines the load time range TA and the end thereof at an on-time $t_{E2}$. The end of the subsequent load relief time range TB1 is then fixed by the timer stage of the data processing means 12 once a period of time TB1–T1 has elapsed since the on-time $t_{E2}$.

This affords the advantage that the data processing means 12 only ever have to deliver the activation information AI to the cut-off means 13 for the period T1 prior to the start of a further load time range TA, whereupon the remainder of the sequence for loading of the electromagnetic carrier field HF is timed by the cut-off means 13, so that the principal power consumers of the data carrier 1 can be advantageously deactivated.

The data carrier 1 furthermore has calibration means, which are formed partly by the data processing means 12 and partly by the switch 16. In the processing described in the example of an embodiment above, the switch 16—as shown in FIG. 1—is mainly set to its right-hand switch position, as a result of which the output 15 of the anti-coincidence stage 14 is connected to the enable inputs E of the clock generating means 10 and of the data processing means 12, and to the switch 6.

The data carrier 1 is designed to calibrate the cut-off time range generated by the cut-off means 13 or the load time range TA only in its normal operating condition (not in its energy-saving operating condition). For this purpose, the data processing means 12 deliver calibration information KI to the switch 16, whereupon the switch 16 is set to its left-hand switch position, and the output 15 of the anti-coincidence stage 14 is connected to a calibration input C of the data processing means 12.

The data processing means 12 then deliver the activation information AI to the cut-off means 13, and simultaneously the timer stage of the data processing means 12 begins to count clock cycles of the clock signal CLK. The number N of clock cycles counted at the moment of the rising edge of the voltage pulse of the blocking information BI and the number K of clock cycles counted at the time of the falling edge of the voltage pulse of the blocking information BI are compared with predetermined values stored in the storage means 2. This affords the advantage that any inaccuracy in the first time period T1, the second time period T2, and hence in the time period of the load time range TA=T2−T1 due to component tolerances of the resistors R2, R3, R4 or R5 and of the capacitor C can be identified in the calibration process. An inaccuracy in the time period of the load time ranges TA would lead to a problem in the decoding of the pulse duration coded transmission data UD in the base station and must therefore be absolutely avoided.

The data carrier 1 may communicate any inaccuracy detected in the time period of the load time range TA as a correction value to the base station, or the data carrier may, if necessary, dynamically change component values of the cut-off means 13 in order to correct the time period of the load time range to the time period set in the specification for the data carrier. The calibration process may be performed periodically, and following the calibration process the data processing means 12 terminate the output of the calibration information KI, whereupon the switch 16 is again set to its right-hand switch position.

It may be mentioned that all means of the data carrier 1 except for the coil 4 can be integrated as a circuit. Producing the circuit in large quantities as an integrated circuit is particularly cost-effective and therefore advantageous.

It may be mentioned that the cut-off time range and the load time range TA need not correspond. It is advantageous if the cut-off time range contains the load time range, since then the storage capacitor 9 will reliably be fully charged at the start of the load time range TA. In this case, furthermore, there is first no loading of the electromagnetic carrier field HF by the data carrier 1, and afterwards the clock generating means 10 and the data processing means 12 are set to their normal operating condition. This ensures that the clock generating means 10 and the data processing means 12 in their normal operating condition can again be supplied directly from the electromagnetic carrier field HF rather than from the back-up capacitor 9. There may also be cases, however, in which it is advantageous if the load time range TA begins or ends before the cut-off time range.

It may be mentioned that principal power consumers of a data carrier may also be taken to be storage means, for example, or other means of the data carrier known to those skilled in the art.

What is claimed is:

1. A data carrier (1) for the transmission of transmission data (UD) to a base station over a transmission time range (TT) containing load time ranges (TA) and load relief time ranges (TB0, TB1), having receiving means (3) for the reception of a carrier signal (TS) from an electromagnetic carrier field (HF) and having power generating means (7) for the generation and storage of a DC power (UB) from the received carrier signal (TS), the DC power (UB) being used for operation of the passive data carrier (1), and having data processing means (12) for the processing and output of the transmission data (UD) to be transmitted and having transmission means (3) for transmission of the transmission data (UD) to the base station over the transmission time range (TT), the electromagnetic carrier field (HF) being subjected to a load (6) by the transmission means (3) over the load time ranges (TA), so that over the load time ranges (TA) the amplitude of the received carrier signal (TS) is essentially less than over the load relief time ranges (TB0, TB1) and the data carrier (1) is operated over the load time ranges (TA) essentially with the stored DC power (UB), characterized in that cut-off means (13) are provided which are designed to deactivate at least one power consumer (10, 12) of the data carrier (1) at a cut-off time ($t_{A1}$, $t_{A2}$) defined by the data processing means (12) or by the transmission means (3) immediately prior to or at the start of each load time range (TA) and which are designed to reactivate the deactivated power consumers (10, 12) once a cut-off time range (TA) following the cut-off time ($t_{A1}$, $t_{A2}$) has elapsed.

2. The data carrier (1) as claimed in claim 1, comprising clock signal generating means (10) for the generation of a clock signal (CLK) for the data carrier (1) from the received carrier signal (TS), characterized in that the cut-off means (13) are designed to deactivate the clock signal generating means (10) at the cut-off time ($t_{A1}$, $t_{A2}$), and to reactivate the deactivated clock signal generating means (10) once the cut-off time range (TA) has elapsed.

3. The data carrier (1) as claimed in claim 2, characterized in that the cut-off means (13) are also designed to deactivate the data processing means (12) at the cut-off time ($t_{A1}$, $t_{A2}$), and to reactivate the deactivated data processing means (12) once the cut-off time range ($t_{A1}$, $t_{A2}$) has elapsed.

4. The data carrier (1) as claimed in claim 2, characterized in that the cut-off means (13) comprise a timer element with a capacitor (C) for determining the duration of the cut-off time range (TA), the capacitor (C) being charged and discharged, respectively, over the load relief time ranges (TB0, TB1) and discharged and charged, respectively, over the cut-off time ranges (TA).

5. The data carrier (1) as claimed in claim 2, characterized in that the transmission means (3) are designed for short-circuiting of the carrier signal (TS), received by the receiving means (3), over the load time ranges (TA).

6. The data carrier (1) as claimed in claim 1, characterized in that calibration means (12, 16) are provided for calibration of the cut-off time range (TA) generated by the cut-off means (13), the cut-off time range (TA) being compared with a predetermined number of N clock cycles generated by the clock signal generating means (10) in order to calibrate the cut-off means (13).

7. The circuit for a data carrier (1) for the transmission of transmission data (UD) to a base station, characterized in that the circuit is of integrated design and that the circuit connected to antenna means (3) forms the data carrier (1) as claimed in claim 1.

8. The circuit as claimed in claim 7, characterized in that clock signal generating means (10) are designed to generate a clock signal (CLK) for the circuit from the received carrier signal (TS), and that cut-off means (13) are designed to deactivate the clock signal generating means (10) at the cut-off time ($t_{A1}$, $t_{A2}$) and to reactivate the deactivated clock signal generating means (10) once a cut-off time range (TA) has elapsed.

9. The circuit as claimed in claim 7, characterized in that calibration means (12, 16) are provided for the calibration of the cut-off time range (TA) generated by the cut-off means (13), the cut-off time range (TA) being compared with a predetermined number of N clock cycles generated by the clock signal generating means (10) in order to calibrate the cut-off means (13).

10. The method of transmitting transmission data (UD) from a data carrier (1) to a base station over a transmission time range (TT) comprising load time ranges (TA) and load relief time ranges (TB0, TB1), the method comprising the following stages:

reception of a carrier signal (TS) from an electromagnetic carrier field (HF);

generation and storage of a DC power (UB) from the received carrier signal (TS), said DC power (UB) being used for operation of the passive data carrier (1);

processing and output of the transmission data (UD) to be transmitted;

transmission of the transmission data (UD) to the base station over the transmission time range (TT), the electromagnetic carrier field (HF) being subjected to a load (6) over the load time ranges (TA), so that over the load time ranges (TA) the amplitude of the received carrier signal (TS) is essentially less than over the load relief time ranges (TB0, TB1), and the data carrier (1) being operated over the load time ranges (TA) essentially by means of the stored DC power (UB), characterized in that at least one power consumer (10, 12) of the data carrier (1) is deactivated at a cut-off time ($t_{A1}$, $t_{A2}$) fixed immediately prior to or at the start of each load time range (TA), and that the deactivated power consumer (10, 12) is reactivated once a cut-off time range (TA) following the cut-off time ($t_{A1}$, $t_{A2}$) has elapsed.

11. The method as claimed in claim 10, characterized in that the cut-off time range (TA) is calibrated, the cut-off time range (TA) being compared with a predetermined number of N clock cycles generated by the clock signal generating means (10).

* * * * *